United States Patent
Hansson (10) Patent No.: US 12,475,876 B2
(45) Date of Patent: Nov. 18, 2025

(54) SYSTEM, COMPUTER-IMPLEMENTED METHOD, COMPUTER PROGRAM AND NON-VOLATILE DATA CARRIER FOR GENERATING AN ACOUSTIC CHANNEL FOR LEVITATION OF MATTER

(71) Applicant: MYVOX AB, Stockholm (SE)

(72) Inventor: Josef Hansson, Sundbyberg (SE)

(73) Assignee: MYVOX AB, Stockholm (SE)

( * ) Notice: Subject to any disclaimer, the term of this patent is extended or adjusted under 35 U.S.C. 154(b) by 249 days.

(21) Appl. No.: 18/038,699

(22) PCT Filed: Dec. 3, 2021

(86) PCT No.: PCT/EP2021/084144
§ 371 (c)(1),
(2) Date: May 24, 2023

(87) PCT Pub. No.: WO2022/128530
PCT Pub. Date: Jun. 23, 2022

(65) Prior Publication Data
US 2024/0062740 A1 Feb. 22, 2024

(30) Foreign Application Priority Data
Dec. 15, 2020 (SE) .................................. 2051469-1

(51) Int. Cl.
*G10K 11/34* (2006.01)
*B06B 1/02* (2006.01)
(Continued)

(52) U.S. Cl.
CPC .......... *G10K 11/346* (2013.01); *B06B 1/0223* (2013.01); *B06B 1/0625* (2013.01);
(Continued)

(58) Field of Classification Search
CPC ...... G10K 15/04; G10K 11/32; G10K 11/343; G10K 11/346; G10K 11/36; G10K 15/00;
(Continued)

(56) References Cited

U.S. PATENT DOCUMENTS 4,402,221 A * 9/1983 Lee .................. G10K 15/00
181/0.5
5,500,493 A * 3/1996 Guigne ............. F16C 32/00
367/191

(Continued)

FOREIGN PATENT DOCUMENTS

WO 2009106282 A2 9/2009
WO 2011033277 A2 3/2011
(Continued)

OTHER PUBLICATIONS

MYVOX AB, International Patent Application No. PCT/EP2021/084144, International Search Report, Mar. 24, 2022.
(Continued)

*Primary Examiner* — Benjamin R Schmitt
(74) *Attorney, Agent, or Firm* — Moore & Van Allen PLLC; W. Kevin Ransom (57) ABSTRACT

An acoustic levitation system contains an acoustic transducer array emitting acoustic energy of periodically varying intensity. The acoustic transducer array includes a set of transducer elements arranged on a surface extending in at least two dimensions. The transducer elements are controllable in response to a control signal so as to emit the acoustic energy at a wavelength and a phase delay determined by the control signal. A controller generates the control signal such that an acoustic channel comprising one or more high-pressure region enclosing a continuous pressure minimum region that extends along a defined channel path from a start position to an end position. The continuous pressure minimum region enclosed by the one or more high-pressure
(Continued)

region represents a trap volume suitable for carrying, levitating and translating matter in a contactless manner.

24 Claims, 3 Drawing Sheets

(51) Int. Cl.
 B06B 1/06 (2006.01)
 G10K 11/32 (2006.01)
 G10K 11/36 (2006.01)
 G10K 15/00 (2006.01)
 G10K 15/04 (2006.01)
(52) U.S. Cl.
 CPC ............ *G10K 11/32* (2013.01); *G10K 11/343* (2013.01); *G10K 11/36* (2013.01); *G10K 15/00* (2013.01); *G10K 15/04* (2013.01); *B06B 2201/40* (2013.01)
(58) Field of Classification Search
 CPC . B06B 1/0223; B06B 1/0625; B06B 2201/40; G01N 29/221; G01N 29/223; G01N 29/262; G01N 29/348
 USPC ........................................................ 73/570.5
 See application file for complete search history.

(56) References Cited

U.S. PATENT DOCUMENTS

| | | | |
|---|---|---|---|
| 2018/0166063 A1 | 6/2018 | Long et al. | |
| 2018/0304500 A1* | 10/2018 | Putkis | B29C 64/264 |
| 2019/0108829 A1 | 4/2019 | Ochiai et al. | |
| 2020/0017376 A1 | 1/2020 | Dionne et al. | |

FOREIGN PATENT DOCUMENTS

| | | | |
|---|---|---|---|
| WO | 2019207143 A1 | 10/2019 | |
| WO | 2020208380 A1 | 10/2020 | |

OTHER PUBLICATIONS

MYVOX AB, International Patent Application No. PCT/EP2021/084144, Written Opinion, Mar. 24, 2022.
MYVOX AB, Swedish Patent Application No. 2051469-1, Swedish Search Report, Aug. 31, 2021.
MYVOX AB, European Patent Application No. 21212219.6, Extended European Search Report, May 9, 2022.
Marzo, Asier, et al., "Holographic acoustic elements for manipulation of levitated objects", Nature Communications, 2015, pp. 1-7.
Zehnter, Sebastian, et al., "A Modular FPGA-based Phased Array System for Ultrasonic Levitation with Matlab", IEEE International Ultrasonics Symposium (IUS), 2019, pp. 654-658.
Sukhanov, D. Ya., et al., "Three-Dimensional Acoustic Levitation of Particles in the Field of Phased Arrays of Ultrasonic Vibrators", 2020, Russian Physics Journal, pp. 258-262, vol. 63, No. 2.
Li Jiyao, et al., "Study on suspension ability of concave spherical ultrasound standing wave using phased arrays", 14th IEEE International Conference on Electronic Measurement & Instruments, 2019, pp. 155-160.
Beasley, William, et al., "Ultrasonic Levitation with Software-defined FPGAs and Electronically Phased Arrays", 2019 NASA/ESA Conference on Adaptive Hardware and Systems (AHS), 2019, pp. 41-48.
Nakahara, Jared, et al., "Contact-less Manipulation of Millimeter-scale Objects via Ultrasonic Levitation", 8th IEEE International Conference on Biomedical Robotics and Biomechatronics (BioRob), 2020, pp. 264-271.
Andrade, Marco A.B., "Acoustic levitation in mid-air: Recent advances, challenges, and future perspectives", Applied Physics Letters, 2020, pp. 250501-1-4, vol. 116.
Marzo, Asier, et al., "Holographic acoustic tweezers", PNAS, 2019, pp. 84-89, vol. 116, No. 1.
Gavrilov, L.R., "The Possibility of Generating Focal Regions of Complex Configurations in Application to the Problems of Stimulation of Human Receptor Structures by Focused Ultrasound", Acoustical Physics, 2008, pp. 269-278, vol. 54, No. 2.

* cited by examiner

SYSTEM, COMPUTER-IMPLEMENTED METHOD, COMPUTER PROGRAM AND NON-VOLATILE DATA CARRIER FOR GENERATING AN ACOUSTIC CHANNEL FOR LEVITATION OF MATTER

CROSS-REFERENCE TO RELATED APPLICATIONS

This application is a National Stage Patent Application (filed under 35 § U.S.C. 371) of PCT/EP2021/084144, filed Dec. 3, 2021, of the same title, which, in turn claims priority to Swedish Patent Application No. 2051469-1 filed Dec. 15, 2020, of the same title; the contents of each of which are hereby incorporated by reference.

FIELD OF THE INVENTION

The present invention relates generally to contactless levitation of matter. Especially, the invention relates to a system and a corresponding computer-implemented method for generating an acoustic channel for levitation of matter. The invention also relates to a computer program and a non-volatile data carrier storing such a computer program.

BACKGROUND OF THE INVENTION

Analogous to optic waves, acoustic waves can create radiation forces. At certain points where these forces converge traps can be created in which particles may be levitated in a stable manner. Such traps can be formed in standing wave fields in various configurations of emitter elements, for example a single sided phased array emitter emitting acoustic wave energy against an acoustically reflective surface as shown in WO 2009/106282. Acoustic traps may also be created between opposing phased array emitters as disclosed in US 2019/0108829; or by a single sided phased array emitter radiating into open space, i.e. without any nearby reflective surface, for example as described in Andrade, M. A. B., et al., "Acoustic Levitation in Mid-Air: Recent Advances, Challenges, and Future Perspectives", Appl. Phys. Lett. 116, 250501 (2020), published online 22 Jun. 2020.

Using a single sided emitter against a reflective surface, as shown in WO 2009/106282, can be used to create one or more fixed line shaped pressure node of traps at the nodes of a standing wave pattern caused by interference between the incident and reflected acoustic waves, to enable an object or matter to move along such a line-shaped pressure node.

By using two opposing phased array emitters, or four phased array emitters being mutually opposing, the trap position can be manipulated in three dimensions. This may be affected by adjusting the focus point and adding a 180° phase delay on the relatively opposing arrays.

By using a single-sided phased array emitter radiating into open space, it is possible to create trap positions by holographically combining phase delays for a focus point with a trap signature. For instance, a tweezer-like twin trap may be produced consisting of two high-pressure regions of opposite phase, which create a trap in between. Alternatively, a vortex trap may be produced, which has a rotating phase around a phase singularity, creating a trap at the point of the singularity. Further, it is possible to create multiple focus points and control their relative phases by using a back-propagation algorithm. This allows for simultaneous manipulations of multiple particles. Here, the single array twin and vortex traps may be recreated by choosing the right focus points and relative phases as described in A. Marzo and B. W. Drinkwater, "Holographic Acoustic Tweezers", PNAS, Vol. 116, No. 1, pp 84-89, 2 Jan. 2019.

Consequently, solutions are known for creating acoustic traps in locations in which objects may be caught and moved in various ways.

However, in these known solutions, the traps are generated at discrete locations and in order to manipulate and move trapped objects, particles or other matter, the acoustic field and the trap locations must change.

Furthermore, solutions are known for creating acoustic traps in the form of one or more discrete line along which e.g. an object or a particle may be caught and translated.

However, in these known solutions, fixed lines-shaped traps are generated at the nodes of a standing wave pattern caused by interference between the incident and reflected acoustic waves of a one-sided emitter and a reflecting surface. In order to change the location of a line-shaped trap, from a first fixed location to a second fixed location, the relative position of the one-sided emitter and the reflecting surface must be adjusted.

There is a need for a solution for acoustically levitating and manipulating objects, particles, or other matter in a more flexible manner.

SUMMARY OF THE INVENTION

The object of the present invention is therefore to offer a solution that mitigates the above problem and renders it possible to levitate objects, particles, or other matter in a more flexible manner. The thus levitated objects, particles or other matter are in one or more embodiment further enabled to be manipulate in a more flexible manner.

This invention concerns the generation of stable acoustic channels that will trap matter within the channel while allowing flow through it. Acoustic channels have the potential to solve several problems with physical channels or pipes. For instance, since acoustic channels are generated from an acoustic field, they are in principle reconfigurable on the fly without mechanically moving parts. Also, acoustic channels are non-contact, which may allow the flow of too hot, corrosive, or sensitive for physical tubing.

According to one aspect of the invention, the object is achieved by an acoustic levitation system containing at least one acoustic transducer array and a controller communicably connected to the at least one acoustic transducer array. The at least one acoustic transducer array is configured to emit acoustic energy of periodically varying intensity. Each of the at least one acoustic transducer array comprises a plurality of transducer elements and the transducer elements are controllable in response to a control signal so as to emit the acoustic energy at a wavelength and phase delay determined by the control signal. The controller is configured to define an acoustic channel comprising one or more high-pressure region enclosing a continuous pressure minimum region that extends along a defined channel path from a start position to an end position, by generating the control signal such that the emitted acoustic energy forms an acoustic-potential field of acoustic waves being constructively combined at a plurality of common focal points. The controller is further configured to generate the control signal such that the plurality of common focal points is divided into N channel control groups, each channel control group comprising at least two common focal points, and such that the common focal points in each channel control group are located along the periphery of a respective circular cross-section of the acoustic channel. The controller is further configured to generate the control signal such that the phases of the at least two common focal points in each channel control group is equally distributed between 0° and 360° around the periphery of the respective circular cross-section and such that the phase of each common focal point in a channel control group corresponds within a preset tolerance, ±T, to the phase of the closest common focal point in the neighboring channel control group or groups.

In certain applications it is desirable to create a stable continuous volume along a preferred path, which will trap matter within the stable continuous volume while allowing flow through it. Suitably, this is enabled by the system described above, by the definition of the acoustic channel enabling trapped matter to move freely along a defined path, within the volume of the continuous pressure minimum region defined by the acoustic channel. This and other embodiments herein thereby allow for the levitation and manipulation of not just discrete particles, but a multitude of objects or particles, streams of particles, liquids, fluids, or matter of any other kind.

Since the acoustic channel may be generated with a great variety of radii or cross-sectional area, and/or three-dimensional curvature, depending on how the channel path and other parameters of the control signal are defined, it provides a very flexible levitation solution that may be adapted to optimize levitation and manipulation according to any number of different scenarios. A few non-limiting advantageous examples are freely controlling the direction and path of a stream of a fluid, e.g. water, or a stream of particles, objects, or other matter, and/or preventing satellite particles from escaping from a flow of a nozzle, i.e. keeping the flow/stream together, but any number of other suitable applications may be envisaged.

Suitably, the fact that the acoustic channel encloses a continuous volume, the size of which can be defined depending on what the circumstances require, enables handling of a quantity, stream and/or flow of matter that is not possible using for example the line shaped acoustic traps of WO 2009/106282, which handles levitation and translation of discrete particles.

Furthermore, since the levitation, and possible translation or flow, is contactless, acoustic channels solve several problems with physical channels or pipes. Any matter which is too hot, corrosive, or sensitive for physical tubing may be handled in a safe and easy manner in the acoustic channel. In other examples, micro-electronic components, caustic liquids, poisonous agents, hot plasmas or by other means hazardous or entities otherwise difficult to handle may be handled safely using acoustic channels defined according to embodiments of the present invention.

Suitably, controlling the phase delay of the acoustic energy emitted by the respective transducer elements of the acoustic transducer array enables controlling how the emitted acoustic waves interfere, so as to cause the emitted acoustic energy to form an acoustic-potential field of acoustic waves being constructively combined at the plurality of common focal points. Furthermore, since the generation of the acoustic channel is software controlled, by controlling the phases of the emitting transducer elements to achieve that acoustic waves are constructively combined at a plurality of common focal points, the acoustic channel may suitably be adapted without moving, replacing, or otherwise adjusting any of the hardware components of the system setup. Using at least one acoustic transducer array comprising a plurality of transducer elements and controlling the phases of the transducer elements is thus very advantageous, as this enables the constructive combining of acoustic waves at common focal point(s) at any three-dimensional position(s) that are accessible to the system. The three-dimensional position(s) that are accessible to the system are here limited by the system components, their arrangement, and their physical properties.

In one preferred embodiment of this aspect of the invention, each channel control group comprises two common focal points. Suitably, since this configuration gives stronger forces in the two common focal points compared to a configuration using more than two common focal points, this enables focusing of a stronger levitation force in a certain direction, e.g. to overcome gravitation in applications where this is the main purpose and controlling the matter in the x-y plane is of less importance. Also, this configuration may enable levitation of heavier matter. Also, this embodiment requires low computational power for defining the acoustic channel and may be achieved using a low number of emitting transducer elements which contributes a low system complexity and lower cost. Of course, an acoustic channel wherein each channel control group comprises two common focal points may also be achieved using a higher number of emitting transducer elements.

Alternatively, each channel control group comprises at least three common focal points. According to preferred embodiments of this aspect of the invention, each channel control group comprises 5 to 10 common focal points, e.g. eight common focal points. More common focal points in each channel control group are also feasible, e.g. 11-50, or even as many as 365 per channel control group, as there is no theoretical upper limit. However, the number of common focal points used for each channel control group is preferably selected depending on the requirements of the application and the available processing speed, wherein an increased number of common focal points per channel control group provides increased accuracy but adds computational complexity. Correspondingly, a decreased number of common focal points per channel reduces the computational complexity, at the cost of lower accuracy.

It should be noted that for controlling held matter (particles for instance) to remain within the acoustic channel, the main factor is that the power of the transducer elements is high enough, depending on the requirements of the particular application.

The common focal points of a channel control group do not have to be evenly distributed along the periphery of the respective circular cross-section as long as the phases of the at least two common focal points in each channel control group are selected such that they the phases are equally distributed between 0° and 360° around the periphery of the respective circular cross-section, so that points on the opposite side of the ring has/would have the opposite phase.

In one or more embodiments, the system is adapted to provide contact-less levitation and/or manipulation of matter by capturing the matter to be levitated and/or manipulated within the continuous pressure minimum region. To this end, the system may optionally comprise or be operationally connected to a driving force device configured to urge the captured matter into motion. Thereby, captured matter may be moved along the acoustic channel.

According to one or more embodiment of this aspect of the invention, each of the at least one acoustic transducer array comprises micromachined ultrasonic transducer, MUT, elements configured to emit acoustic energy in the form of ultrasonic energy. Thereby, the acoustic levitation system may advantageously be miniaturized.

According to one or more embodiment of this aspect of the invention, each of the at least one acoustic transducer array is a phased array. Suitably, a direct and simple generation and control of the acoustic-potential field, and thus the acoustic channel CH, is thereby enabled.

Furthermore, the number, N, of channel control groups/ "control rings", along the acoustic channel may also be selected depending on the requirements of the application and the available processing speed, wherein an increased number of rings provides increased accuracy but also requires more computational power.

According to one or more embodiment of this aspect of the invention, the controller may be configured to redefine the acoustic channel, by varying at least one channel parameter. The channel parameters may comprise a selection of: a start position for the path, an end position for the path, a direction or route for the path, a radius of one or more of the respective circular cross-section of the acoustic channel, a value for N, the number of channel control group to be created along the acoustic channel, and/or the number of common focal points to be included in each or any of the channel control groups. Suitably, the acoustic channel can thereby be redefined to optimize it to the application or system capacity, or to adjust the acoustic channel to changes required over time.

The system may in some embodiments of this aspect of the invention comprise an input device communicatively connected to the controller. The controller is in these embodiments configured to receive an input signal indicative of at least one channel parameter from the input device, and to define or redefine the acoustic channel based on the received input signal. Suitably, a user of the system is thereby enabled to redefine the acoustic channel to optimize it to the application or system capacity, or to adjust the acoustic channel to changes required over time.

Advantageously, the controller may be configured to define or redefine the acoustic channel according to any embodiment herein in real time or close to real time.

According to one embodiment of this aspect of the invention, the acoustic levitation system may comprise a single acoustic transducer array. Thereby, a low complexity acoustic levitation system can be achieved.

According to another embodiment of this aspect of the invention, the acoustic levitation system may comprise at least two acoustic transducer arrays arranged opposite to one another, e.g. either two opposing arrays, or four arrays being arranged pairwise, mutually opposite to one another. The two-dimensional configurations of the set of transducer elements in respective acoustic transducer arrays of the opposing acoustic transducer arrays extend in planes being parallel to one another. Suitably, the use of opposing arrays, enclosing the generated acoustic-potential field on two or more sides, makes it easier to generate the acoustic-potential field evenly, and thus to generate a more even and more stable acoustic channel CH for levitation. Depending on the technology and materials available other enclosures, such as cylindrical arrays e.g., are also feasible. Such a cylinder, or other curved enclosure (i.e. enclosure with one or more nonlinear section), may comprise one or more continuous curved array and/or comprise multiple discrete arrays assembled to provide an enclosure of the desired shape.

According to one or more embodiment of this aspect of the invention, the transducer elements in the at least one acoustic transducer array are arranged in a first number of rows and a second number of columns. In other words, the at least one acoustic transducer array has a general rectangular outline.

The transducer elements in the at least one acoustic transducer array may be flat. Thus, a simple and compact design is accomplished.

Alternatively, the transducer elements may be arranged on a concave side of a spherical surface segment. This configuration facilitates concentrating high acoustic energies to each of the at least two common focal points.

According to another aspect of the invention, the object is achieved by a computer-implemented method for levitating matter. The method involves generating a control signal which is configured to cause at least one acoustic transducer array to emit acoustic energy of periodically varying intensity.

It is presumed that each of the at least one acoustic transducer arrays contains a set of transducer elements arranged on a surface extending in two or three dimensions. I.e. transducer elements are located on a flat or a curved surface. It is further presumed that the transducer elements are controllable in response to the control signal so as to emit the acoustic energy at a wavelength and a phase delay determined by the control signal. The control signal is generated such that the emitted acoustic energy forms an acoustic-potential field of acoustic waves being constructively combined at a plurality of common focal points, the plurality of common focal points being divided into N channel control groups, each channel control group comprising at least two common focal points, the common focal points in each channel control group being located along the periphery of a respective circular cross-section of the acoustic channel, wherein the phases of the at least two common focal points in each channel control group is equally distributed between 0° and 360° around the periphery of the respective circular cross-section, and the phase of each common focal point in a channel control group corresponds within a preset tolerance, ±T, to the phase of the closest common focal point in the neighboring channel control group or groups, thereby defining an acoustic channel comprising one or more high-pressure region(s) enclosing a continuous pressure minimum region that extends along a defined channel path. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

An acoustic channel achieved according to embodiments herein is defined as an acoustic field in which acoustic radiation forces converge towards a defined channel path, with little to no forces along the path and within a continuous low-pressure or pressure minimum volume, hereinafter referred to as a pressure minimum region, along the path. In effect, embodiments herein create a "stretched out" version of a twin trap (in the case of two control points per ring) or vortex trap, with maintained trapping force perpendicular to the acoustic channel, but without any trapping forces along the channel, specifically without any trapping forces within the continuous pressure minimum region. This allows matter in the form of e.g. particles or fluids to simultaneously be trapped and optionally translated, as a flow or stream, along the path and within the node formed by the continuous pressure minimum region/volume in a contactless manner. The continuous pressure minimum region is surrounded or enclosed by one or more high-pressure regions.

The acoustic channel can be created by phased array transducers, other types of transducers, metamaterials and/or other methods and systems capable of creating complex acoustic fields.

In all embodiments, the acoustic channel is configured and/or designed to hold and/or lead matter (wherein the matter may e.g. comprise objects, particles, fluid etc.) contactlessly in a medium. The medium may be, but is not limited to, air, water or another suitable fluid or substance. In all embodiments, the matter being held and/or led in the acoustic channel must have a density that is higher than the density of the medium.

A distance is herein defined as a three-dimensional distance in space (x, y, z), unless otherwise specified.

N, wherein N≥2, is the number of channel control groups to be created along the acoustic channel.

System Architecture

Firstly, a system 100 according to embodiments of the invention will be described in connection with FIGS. 1 to 7.

Figure 1:
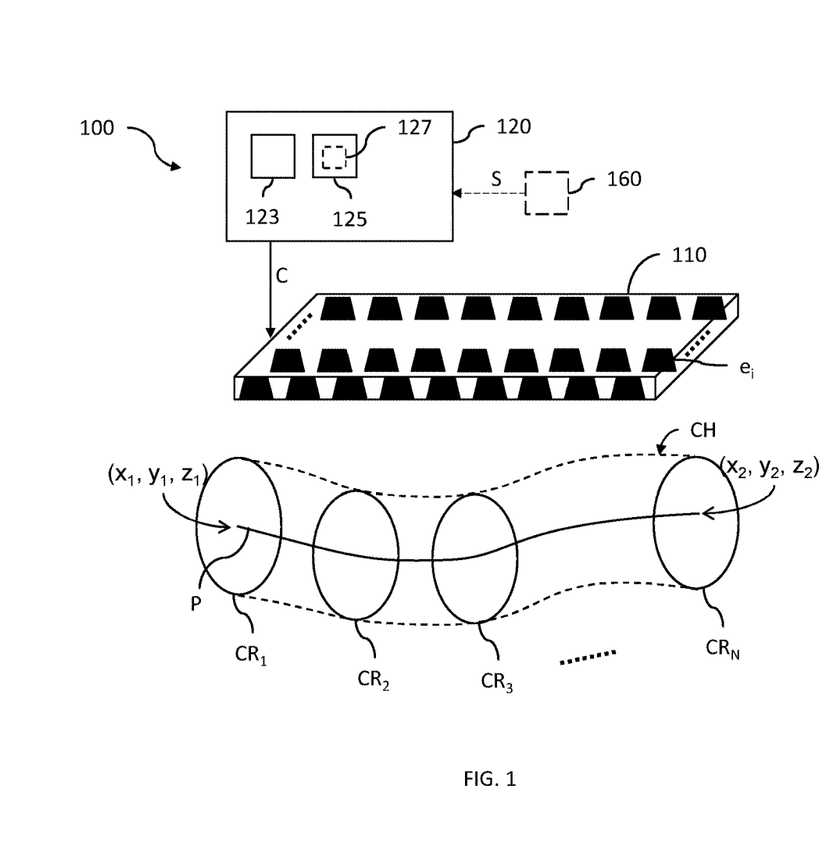
FIG. 1 shows an acoustic levitation system according to a first embodiment of the invention.

FIG. 1 shows an acoustic levitation system 100 according to a first embodiment of the invention.

The system 100 includes at least one acoustic transducer array 110 and a controller 120. Each of the at least one acoustic transducer array 110 is configured to emit acoustic energy of periodically varying intensity, i.e. sound waves, at for example a frequency in an interval between 20 KHz and 200 kHz, such as around 40 kHz. In some embodiments, one or more of the at least one acoustic transducer array is a phased array.

Each acoustic transducer array 110, in turn, includes a set of transducer elements $e_i$ arranged on a surface. Here, the surface is flat and the transducer elements $e_i$ are arranged in a first number of rows and a second number of columns. This renders it comparatively straightforward to control the transducer elements $e_i$ to create a desired acoustic-potential field of acoustic waves being constructively combined at a plurality of common focal points $135_j$. Namely, the transducer elements $e_i$ are controllable in response to a control signal C so as to emit the acoustic energy at a wavelength and a phase delay determined by the control signal C.

Figure 2:
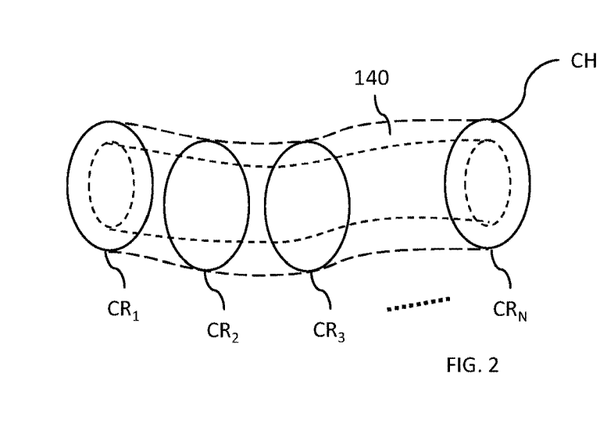
FIG. 2 schematically illustrates an acoustic channel according to the invention.
Figure 3:
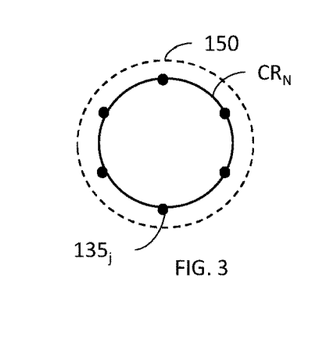
FIG. 3 schematically illustrates a channel control group comprising a plurality of common focal points.

The controller 120 is configured to define an acoustic channel CH comprising high-pressure regions $130_k$ enclosing a continuous pressure minimum region 140 that extends along a defined channel path P from a start position $x_1$, $y_1$, $z_1$ to an end position $x_2$, $y_2$, $z_2$. The path P may be linear or curved in any suitable manner in the x-, y- and/or z-plane. To this end, the controller 120 is configured to generate a control signal C such that the emitted acoustic energy forms an acoustic-potential field of acoustic waves being constructively combined at a plurality of common focal points $135_j$. The plurality of common focal points $135_j$ are divided into N channel control groups $150_N$, wherein N≥2. N=2 is the theoretical minimum limit for the acoustic channel defined and/or generated according to embodiments herein to function as intended. In most applications however, it is assumed that the acoustic channel CH will be of a length that requires N to be greater than 2 in order to enable the pressure minimum region 140 to be continuous, and thus the acoustic channel CH to be stable and enable trapping/levitation and optionally manipulation of matter, from the start position $x_1$, $y_1$, $z_1$ to an end position $x_2$, $y_2$, $z_2$. The number N required for the acoustic channel CH to be stable depends on the application, including factors such as the length, width and/or curvature of the channel path P, the density and/or other relevant properties of the matter to be levitated, interference on the levitation system by surrounding components, and/or external forces acting on the matter to be levitated, including but not limited to gravity. Each channel control group 150 comprises at least two common focal points $135_j$. An example of a channel control group 150 comprising a plurality of common focal points $135_j$ is schematically shown in FIG. 3. As illustrated in FIGS. 3 and 4A to 4D, the common focal points $135_j$ in each channel control group 150 are located along the periphery of a respective circular cross-section CRN of the acoustic channel CH. The circular cross-sections CRN of the acoustic channel CH are distributed, evenly or unevenly, along the path P from the start position $x_1$, $y_1$, $z_1$ to the end position $x_2$, $y_2$, $z_2$. FIG. 2 schematically illustrates an acoustic channel CH defined according to embodiments of the invention, with a continuous pressure minimum region 140.

The phases of the at least two common focal points 135$_j$ in each channel control group 150 is equally distributed between 0° and 360° around the periphery of the respective circular cross-section CR. Ideally, the phase delay in exactly opposing common focal points 135$_j$ should thereby be opposite, i.e. differ by 180°. Of course, this criterion is not perfectly sharp, which means that it also works for minor deviations from 180°, however less efficiently.

The phase of each common focal point 135 in a channel control group 150 corresponds within a preset tolerance, ±T, to the phase of the closest common focal point 135 in the neighboring channel control group, or the two neighboring groups if the channel control group is not at an end point of the acoustic channel CH.

By generating the control signal C such that the phase of each common focal point 135 in a channel control group 150 corresponds within a preset tolerance, ±T, to the phase of the closest common focal point 135 in the neighboring channel control group(s) a stable acoustic channel is achieved. The preset tolerance T is preferably less than 30°, more preferably less than 20°, more preferably less than 10°, most preferably less than 5°. In a non-limiting example the preset tolerance T is less than 1°. How small the preset tolerance T needs to be for the defined acoustic channel CH to be stable differs between applications, and depends among other things on how close the neighboring channel control groups 150$_N$ are in the acoustic channel CH, which can be derived from the number of channel control groups, N.

The one or more pressure region comprises one or more, continuous or discrete, high-pressure region(s) 130$_k$ that encloses the continuous pressure minimum region 140. The continuous pressure minimum region 140 will thereby have a volume depending on the length of the channel path P and the cross-section area of the continuous pressure minimum region 140, i.e. the cross-section area between the one or more high pressure region(s) 130$_k$. The cross-section area of the continuous pressure minimum region 140 may be the same along the channel path P, or it may vary along the channel path P dependent on how the acoustic channel CH is defined. The cross-section area of the continuous pressure minimum region 140 may further vary along the channel path P due to natural deviations caused by the shape and size of the one or more high pressure region(s) 130$_k$.

Each channel control group may comprise at least three common focal points. According to non-limiting embodiments, each channel control group may comprise 5 to 10 common focal points, e.g. eight common focal points.

Figure 4A:
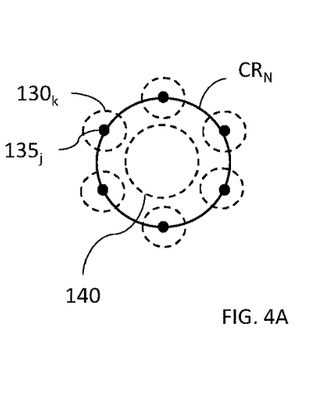
FIG. 4A schematically illustrates a cross-section of an acoustic channel according to an embodiment of the invention, with one or more high-pressure regions enclosing a continuous pressure minimum region.
Figure 4B:
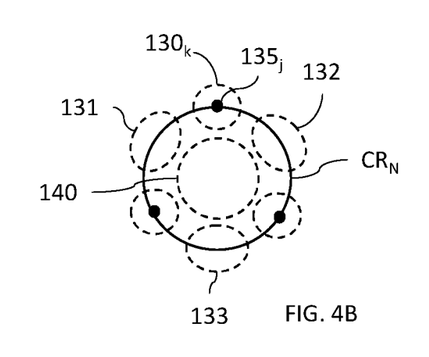
FIG. 4B schematically illustrates a cross-section of an acoustic channel according to an embodiment of the invention, with one or more high-pressure regions enclosing a continuous pressure minimum region.
Figure 4C:
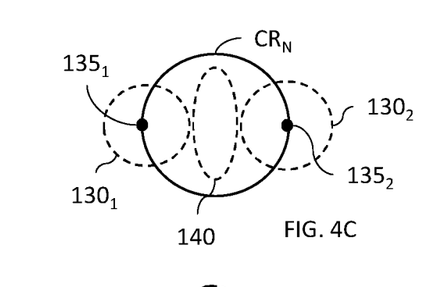
FIG. 4C schematically illustrates a cross-section of an acoustic channel according to an embodiment of the invention, with one or more high-pressure regions enclosing a continuous pressure minimum region.
Figure 4D:
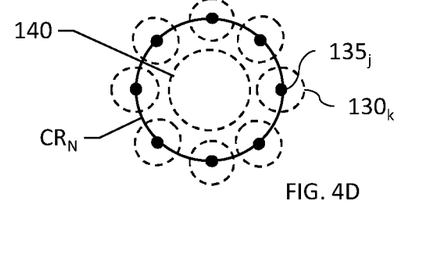
FIG. 4D schematically illustrates a cross-section of an acoustic channel according to an embodiment of the invention, with one or more high-pressure regions enclosing a continuous pressure minimum region.

The number of common focal points used for each channel control group may be selected depending on the requirements of the application and the available processing speed, wherein an increased number of common focal points per channel control group provides increased accuracy but adds computational complexity. Correspondingly, a decreased number of common focal points per channel reduces the computational complexity, at the cost of lower accuracy. In this context, increased accuracy means that the forces directed inwards at each circular cross-section, from the one or more high-pressure region towards the continuous pressure minimum region, become more evenly distributed along the cross-section. Furthermore, increased accuracy is to be understood as the resulting acoustic channel, or more specifically each channel control group, becoming more evenly circular in shape, rendering a continuous pressure minimum region that is more evenly circular in shape at the location of each channel control group. There is no theoretical upper limit of number of common focal points per channel control group, the number may be set freely depending on requirements of the application, but it is limited by the computational power of the system. Also, the increase in accuracy of adding a common focal point to the channel control group is insignificant if the number of common focal points is already high. For example, 360 common focal points per channel control group would render almost perfect control of the forces and circular shape of the sections of the acoustic channel, but it would be very computationally expensive and the gain in accuracy may be very small compared to for instance using 180, 90 or even 30 common focal points per channel control group, depending on for instance the matter to be handled, the application and accuracy demands thereof, the radius of the acoustic channel, etc. FIG. 4A, shows a cross-section CRN of an acoustic channel CH with a channel control group comprising six common focal points 135. As illustrated in the example of FIG. 4A, each common focal point 135 is at the center of a high-pressure region 130, since emitted acoustic energy is constructively combined at each common focal point 135. This may result in more than one discrete high-pressure regions 130$_k$ enclosing the continuous low-pressure region 140, or in a continuous high-pressure region 130 enclosing the continuous low-pressure region 140 if the high-pressure regions overlap. Similar examples are shown in FIG. 4C, illustrating the case of two common focal point 135, and in FIG. 4D, illustrating the case of eight common focal point 135. Again, there may in these examples be more than one discrete high-pressure regions 130$_k$, or a continuous high-pressure region 130 enclosing the continuous low-pressure region 140, even though the probability of high-pressure regions 130$_k$ overlapping and forming a continuous high-pressure region increases with a higher number of common focal point 135. FIG. 4B illustrates that besides the high-pressure regions 130$_k$, one or more additional high-pressure region may be caused by emitted acoustic energy interfering and being constructively combined around the cross-section CR also at positions other than the common focal points 135. This is in FIG. 4B exemplified by the additional high-pressure regions 131, 132 and 133. Also in these examples there may be more than one discrete high-pressure regions 130$_k$, or a continuous high-pressure region 130 enclosing the continuous low-pressure region 140.

The effect becomes stronger—meaning that heavier objects can be trapped and moved—if the difference in pressure between the one or more high-pressure regions 130, 131, 132, 133 and the pressure in the continuous pressure minimum region 140 increases.

Figure 5:
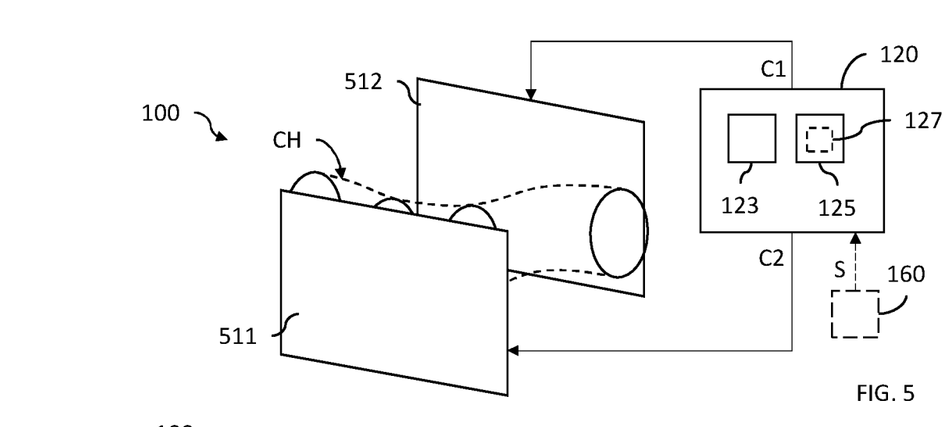
FIG. 5 shows an acoustic levitation system according to a second embodiment of the invention.

FIG. 5 shows an acoustic levitation system 100 according to a second embodiment of the invention, where two acoustic transducer arrays 511 and 512 respectively are arranged opposite to one another on a respective flat surface being parallel to one another. Preferably, as illustrated in FIG. 5, the channel path P is in this embodiment defined to extend in a plane parallel or substantially parallel to the two acoustic transducer arrays 511 and 512. By using arrays that enclose the acoustic-potential field generated on two sides it is easier to generate an even and stable acoustic channel CH. A further advantage is that the ends of the acoustic channel CH are not covered by an array, but instead open, so that it is easy to urge captured matter into motion from the start position $x_1, y_1, z_1$ to the end position $x_2, y_2, z_2$ of the channel path P, or in the opposite direction, using a driving force device positioned near the start position $x_1, y_1, z_1$ or near the end position $x_2, y_2, z_2$.

Analogous to the above, each of the acoustic transducer arrays 511 and 512 is configured to emit acoustic energy of periodically varying intensity. Each of the acoustic transducer arrays 511 and 512 also includes a set of transducer elements $e_i$ arranged on a surface extending in two dimensions. The transducer elements $e_i$ of the acoustic transducer arrays 511 and 512 are controllable in response to a respective control signal C1 and C2 so as to emit the acoustic energy at a wavelength and a phase delay determined by the control signals C1 and C2.

In this second system embodiment of the invention, in likeness to the first embodiment, the controller 120 is configured to generate the control signals C1 and C2 such that the emitted acoustic energy forms an acoustic-potential field of acoustic waves being constructively combined at a plurality of common focal points $135_j$, divided into N channel control groups $150_N$, each channel control group 150 comprising at least two common focal points $135_j$ being located along the periphery of a respective circular cross-section CRN of the acoustic channel CH. The controller 120 is also in this embodiment configured to generate the control signals C1 and C2 such that the phases of the at least two common focal points $135_j$ in each channel control group 150 is equally distributed between 0° and 360° around the periphery of the respective circular cross-section CR, and such that the phase of each common focal point 135 in a channel control group 150 corresponds within a preset tolerance, ±T, to the phase of the closest common focal point 135 in the neighboring channel control group or groups 150.

Figure 6:
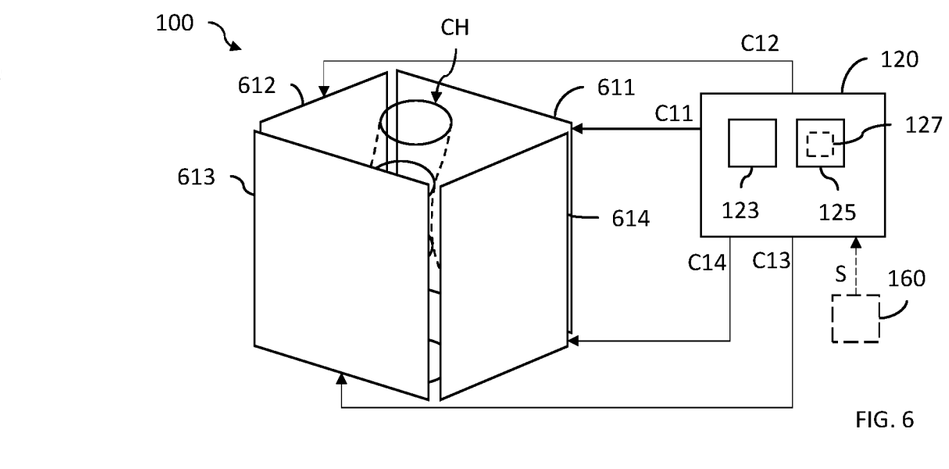
FIG. 6 shows an acoustic levitation system according to a third embodiment of the invention.

FIG. 6 shows an acoustic levitation system 100 according to a third embodiment of the invention, where, basically, the setup of acoustic transducer arrays has been doubled relative to the embodiment shown in FIG. 5. Specifically, in the third embodiment of the invention, four acoustic transducer arrays 611, 612, 613 and 614 respectively are arranged pairwise opposite to one another. Preferably, as illustrated in FIG. 6, the channel path P is in this embodiment defined to extend from one opening in the "box" defined by the four acoustic transducer arrays 611, 612, 613 and 614. By using arrays that enclose the acoustic-potential field generated on four sides (or continuously in the shape of a cylinder or the like) it is even easier to generate an even and stable acoustic channel CH. In likeness with the embodiment of FIG. 5, the ends of the acoustic channel CH are not covered by an array, but instead open, so that it is easy to urge captured matter into motion from the start position $x_1$, $y_1$, $z_1$ to the end position $x_2$, $y_2$, $z_2$ of the channel path P, or in the opposite direction, using a driving force device positioned near the start position $x_1$, $y_1$, $z_1$ or near the end position $x_2$, $y_2$, $z_2$.

The four acoustic transducer arrays 611, 612, 613 and 614 are arranged on a respective flat surface being pairwise parallel to the opposing array, i.e. here a first acoustic transducer array 611 is parallel to a third acoustic transducer array 613, and a second acoustic transducer array 612 is parallel to a fourth acoustic transducer array 614.

Each of the acoustic transducer arrays 611, 612, 613 and 614 is configured to emit acoustic energy of periodically varying intensity. Each of the acoustic transducer arrays 611, 612, 613 and 614 also includes a set of transducer elements (not shown) arranged on a surface extending in two dimensions. The transducer elements of the acoustic transducer arrays 611, 612, 613 and 614 are controllable in response to a respective control signal C11, C12, C13 and C14 so as to emit the acoustic energy at a wavelength and a phase delay determined by the control signals C11, C12, C13 and C14.

Figure 7:
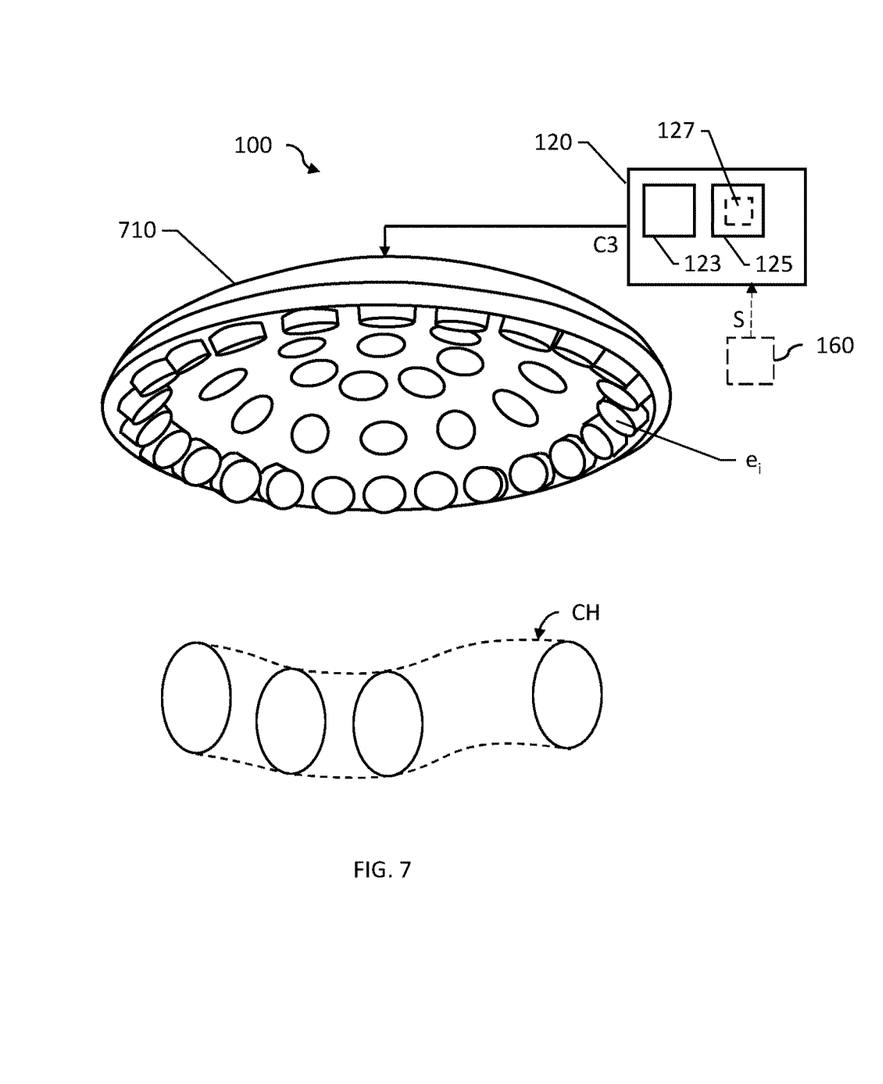
FIG. 7 shows an acoustic levitation system according to a third embodiment of the invention.

FIG. 7 shows an acoustic levitation system 100 according to a fourth embodiment of the invention. Here, the transducer elements $e_i$ in the acoustic transducer array 710 are arranged on a concave side of a spherical surface segment, i.e. a surface extending in three dimensions. This configuration is advantageous because it enables a higher concentration of acoustic energy towards the plurality of common focal points $135_j$, so that the thus defined acoustic channel CH enables levitation of heavier objects, particles, or other matter than if the acoustic transducer array had extended along a flat—two-dimensional—surface.

If suitable, a combination of the first, second, third and/or fourth embodiments may be used, e.g. a combination of one or more acoustic transducer array extending along a flat—two dimensional—surface with one or more acoustic transducer array being arranged on a concave side of a spherical surface segment, i.e. a surface extending in three dimensions. The acoustic transducer arrays may in such combinations be arranged alongside each other or arranged pairwise opposite to one another in different arrangements.

One or more of the at least one acoustic transducer array 110 may be a micromachined ultrasonic transducer, MUT, configured to emit acoustic energy in the form of ultrasonic energy.

The controller 120 may apply any algorithm that allows for generating a control signal C causing the acoustic transducer array 110 to generate a plurality of common focal points with relative phases to produce one or more high-pressure, or pressure maximum, region enclosing a continuous low-pressure, or pressure minimum, region that extends along a defined channel path P. For example, the controller 120 may employ an iterated backpropagation algorithm as described in A. Marzo and B. W. Drinkwater, "Holographic Acoustic Tweezers", PNAS, Vol. 116, No. 1, pp 84-89, 2 Jan. 2019. Alternatively, the so-called Broyden-Fletcher-Goldfarb-Shanno (BFGS) algorithm may be used, which is an iterative method for solving unconstrained nonlinear optimization problems. Moreover, the controller 120 may use the algorithm described in L. R. Gavrilov, "The Possibility of Generating Focal Regions of Complex Configurations in Application to the Problems of Stimulation of Human Receptor Structures by Focused Ultrasound", Acoustical Physics, 2008, Vol. 54, No. 2, pp. 269-278, DOI: 10.1134/S1063771 008020152.

The system 100 according to any embodiment herein may further be adapted to provide contact-less levitation and/or manipulation of matter by capturing the matter to be levitated and/or manipulated within the continuous pressure minimum region. To this end, the system may further optionally comprise or be operationally connected to a driving force device configured to urge the captured matter into motion. Thereby, captured matter may be moved along the acoustic channel. Such a driving force device may be positioned near the start position $x_1$, $y_1$, $z_1$ and arranged to urge the captured matter into motion from the start position $x_1$, $y_1$, $z_1$ to the end position $x_2$, $y_2$, $z_2$ of the channel path P. Alternatively, the driving force device may be positioned near the end position $x_2$, $y_2$, $z_2$ and arranged to urge the captured matter into motion from the end position $x_2$, $y_2$, $z_2$ to the start position $x_1$, $y_1$, $z_1$ of the channel path P. Alternatively, driving force device may be positioned external to the acoustic channel CH anywhere along the acoustic channel. Suitably, levitated matter can be transferred using relatively low force. Levitated matter can be transported by a host of driving forces such as acoustic forces, electric forces, magnetic forces, flow of the medium, radiation pressure, momentum from the injection/insertion, etc. In the embodiment where the driving force is acoustic energy the driving force device may be one or more of the at least one acoustic transducer array 110, 511, 512, 611, 612, 613, 614, 710, or an acoustic driving force device external to the system 100. Electrical methods include dielectrophoresis.

This technique is sometimes preferred because it can be applied to any dielectric material, including water. The object or droplet need not be electrically charged, magnetic, or optically transparent. Possible drawbacks of actuation by flow of the medium are that it requires mechanical components (incl. a pump and valves) and that it is prone to contamination. A second method that is preferred in some cases is the use of the momentum from injection/insertion, injection referring to liquids and insertion to solid objects. Droplets gain momentum when injected for example with inkjet technology. Solid objects can be propelled upon insertion into the system. The use of initial momentum is a preferred method for systems where the velocity of the levitated matter need not be actively controlled very precisely.

The controller 120 may further be configured to redefine the acoustic channel CH, by varying at least one channel parameter. The channel parameters may comprise any selection of: a start position $x_1, y_1, z_1$ for the path P; an end position $x_2, y_2, z_2$ for the path P; a direction or route for the path P; a radius R of one or more of the respective circular cross-section CR1 . . . . N of the acoustic channel CH; a value for N; and/or the number of common focal points 135 to be included in each or any of the channel control groups 150.

The system 100 according to any embodiment herein may further comprise an input device 160 communicatively connected to the controller 120. The controller 120 is then configured to receive an input signal S from the input device 160, the input signal S being indicative of at least one channel parameter. The input signal may be generated in response to a user interacting with the input device 160. Alternatively, or in combination, the system 100 may be configured to generate an input signal S based on data received from e.g. one or more sensor, calculations of performance of the acoustic channel CH, etc., and convey the input signal S to the controller 120. The controller 120 is in any of these embodiments further configured to define or redefine the acoustic channel CH based at least on the received input signal S.

It is generally advantageous if the controller 120 is configured to effect the above-described procedure in an automatic manner by executing a computer program 127. Therefore, the controller 120 may include a memory unit 126, i.e. non-volatile data carrier, storing the computer program 127, which, in turn, contains software for making processing circuitry in the form of at least one processor 123 in the controller 120 execute the actions mentioned in this disclosure when the computer program 127 is run on the at least one processor 123.

Method Embodiments

Figure 8:
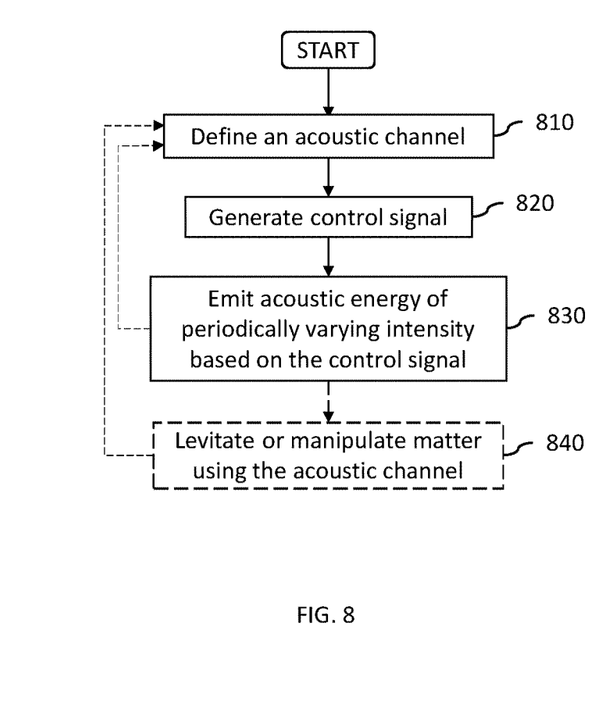
FIG. 8 illustrates, by means of a flow diagram, a method according to one or more embodiment of the invention.

With reference to the flow diagram in FIG. 8, and also with reference to FIGS. 1 to 7 as described above, we will now describe the computer-implemented method according to one or more embodiment of the invention. The method comprises:

In step 810: defining, by the controller 120, an acoustic channel CH comprising one or more high-pressure region 130$_k$ enclosing a continuous pressure minimum region 140 that extends along a defined channel path P from a start position $x_1, y_1, z_1$ to an end position $x_2, y_2, z_2$.

In step 820: generating, by the controller 120, a control signal C, C1, C2, C3, C11, C12, C13, C14 which is configured to cause at least one acoustic transducer array 110, 511, 512, 611, 612, 613, 614, 710 to emit acoustic energy of periodically varying intensity.

It is presumed that each of the at least one acoustic transducer array includes a set of transducer elements e; arranged on a surface extending in two or three dimensions. It is further presumed that the transducer elements are controllable in response to the control signal so as to emit the acoustic energy at a wavelength and a phase delay determined by the control signal.

The control signal is generated such that the emitted acoustic energy forms an acoustic-potential field of acoustic waves being constructively combined at a plurality of common focal points 135$_j$, the plurality of common focal points 135$_j$ being divided into N channel control groups 150$_N$, each channel control group 150 comprising at least two common focal points 135$_j$, the common focal points 135; in each channel control group 150 being located along the periphery of a respective circular cross-section CRN of the acoustic channel CH, wherein the phases of the at least two common focal points 135$_j$ in each channel control group 150 is equally distributed between 0° and 360° around the periphery of the respective circular cross-section CR, and the phase of each common focal point 135 in a channel control group 150 corresponds within a preset tolerance, ±T, to the phase of the closest common focal point 135 in the neighboring channel control group or groups 150.

Thereby, there is created an acoustic channel CH which in accordance with the definition comprises one or more high-pressure region 130$_k$ enclosing a continuous pressure minimum region 140. The circular cross-sections CRN of the acoustic channel CH are preferably distributed, evenly or unevenly, along the path P from the start position $x_1, y_1, z_1$ to the end position $x_2, y_2, z_2$, to ensure that the acoustic channel CH extends along the defined channel path P from the start position $x_1, y_1, z_1$ to the end position $x_2, y_2, z_2$.

The continuous pressure minimum region 140 enclosed by the one or more high-pressure region 130$_k$ represents a trap volume suitable for carrying, levitating and translating matter in a contactless manner.

Depending on the application, the method may comprise generating the control signal C, C1, C2, C3, C11, C12, C13, C14 such that each channel control group 150 comprises at least three common focal points 135$_j$, for example 5-10 common focal points 135$_j$. In a no-limiting preferred embodiment, the number of common focal points 135$_j$ in each channel control group 150 is eight.

Generating the control signal C, C1, C2, C3, C11, C12, C13, C14 in step 820 may comprise receiving, from an input device 160 communicatively connected to the controller 120, an input signal S indicative of at least one channel parameter, and generating the control signal C, C1, C2, C3, C11, C12, C13, C14 also based on the received input signal S. The channel parameters may as described in connection with the system embodiments comprise a selection of: a start position $x_1, y_1, z_1$ for the path P, an end position $x_2, y_2, z_2$ for the path P, a direction or route for the path P, a radius R of one or more of the respective circular cross-section CR1 . . . . N of the acoustic channel CH, a value for N, and/or the number of common focal points 135$_j$ to be included in each or any of the channel control groups 150.

In a subsequent step 830, the at least one acoustic transducer array emits acoustic energy, which acoustic energy has a wavelength and a phase delay determined by the control signal.

The method may further comprise, in step 840: providing contact-less levitation or manipulation of matter by capturing the matter to be levitated and/or manipulated within the continuous pressure minimum region 140.

The contact-less levitation and/or manipulation of matter may comprise urging the captured matter into motion using a driving force device, as further described in connection with the system embodiments.

In some embodiments, the method further comprises re-defining the acoustic channel CH, as indicated by the dashed arrow in FIG. 8 showing that the method may loop back from step 830 or step 840 to step 810. Re-defining the acoustic channel CH, by the controller 120, may comprise receiving an input signal S indicative of at least one channel parameter, as described in connection with step 820, and re-defining the acoustic channel CH based on the received input signal S.

Further Embodiments

All of the process steps, as well as any sub-sequence of steps, described with reference to FIG. 8 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps, or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures but may be varied freely within the scope of the claims.

The invention claimed is:

1. An acoustic levitation system comprising:
at least one acoustic transducer array configured to emit acoustic energy of periodically varying intensity, each of the at least one acoustic transducer array comprising a plurality of transducer elements, the transducer elements being controllable in response to a control signal so as to emit the acoustic energy at a wavelength and phase delay determined by the control signal; and
a controller communicably connected to the at least one acoustic transducer array, the controller being configured to define an acoustic channel comprising one or more high-pressure regions enclosing a continuous pressure minimum region that extends along a defined channel path from a start position to an end position, by generating the control signal such that the emitted acoustic energy forms an acoustic-potential field of acoustic waves being constructively combined at a plurality of common focal points, the plurality of common focal points being divided into N channel control groups, each channel control group comprising at least two common focal points, the common focal points in each channel control group being located along a periphery of a respective circular cross-section of the acoustic channel, phases of the at least two common focal points in each channel control group are equally distributed between 0° and 360° around the periphery of the respective circular cross-section, and a phase of each common focal point in a channel control group corresponds within a preset tolerance to a phase of a closest common focal point in a neighboring channel control group or groups.

2. The acoustic levitation system of claim 1, wherein each of the at least one acoustic transducer array is a micromachined ultrasonic transducer configured to emit acoustic energy in the form of ultrasonic energy.

3. The acoustic levitation system of claim 1, wherein each of the at least one acoustic transducer arrays is a phased array.

4. The acoustic levitation system of claim 1, wherein each channel control group comprises at least three common focal points.

5. The acoustic levitation system of claim 1, wherein each channel control group comprises eight common focal points.

6. The acoustic levitation system of claim 1, wherein the system is adapted to provide contact-less levitation or manipulation of matter by capturing the matter to be levitated or manipulated within the continuous pressure minimum region.

7. The acoustic levitation system of claim 1, wherein the controller is configured to redefine the acoustic channel, by varying at least one channel parameter, the channel parameters comprising a selection of:
a start position for the path;
an end position for the path;
a direction or route for the path;
a radius of one or more of the respective circular cross-section of the acoustic channel;

a value for N; or a number of common focal points to be included in each channel control group.

8. The acoustic levitation system of claim 1 further comprising an input device communicatively connected to the controller, wherein the controller is configured to:
receive from the input device an input signal indicative of at least one channel parameter, and
define or redefine the acoustic channel based on the received input signal.

9. The acoustic levitation system according to claim 1 comprising a single acoustic transducer array.

10. The acoustic levitation system according to claim 1 comprising at least two acoustic transducer arrays arranged opposite to one another, the two-dimensional configurations of the set of transducer elements in respective acoustic transducer arrays of the opposing acoustic transducer arrays extending in planes being parallel to one another.

11. The acoustic levitation system according to claim 10, comprising four acoustic transducer arrays arranged pair-wise opposite to one another.

12. The acoustic levitation system according to claim 1, wherein the transducer elements in the at least one acoustic transducer array are arranged in a first number of rows and a second number of columns.

13. The acoustic levitation system according to claim 1, wherein the transducer elements in the at least one acoustic transducer array are arranged on a concave side of a spherical surface segment.

14. A computer-implemented method for levitating matter, the method comprising:
defining an acoustic channel comprising one or more high-pressure region enclosing a continuous pressure minimum region that extends along a defined channel path from a start position to an end position; and
generating, by a controller, a control signal which is configured to cause at least one acoustic transducer array to emit acoustic energy of periodically varying intensity, each of the at least one acoustic transducer array comprising a plurality of transducer elements, and the transducer elements being controllable in response to the control signal so as to emit the acoustic energy at a wavelength and phase delay determined by the control signal, and the control signal being generated such that the emitted acoustic energy forms an acoustic-potential field of acoustic waves being constructively combined at a plurality of common focal points, the plurality of common focal points being divided into N channel control groups, each channel control group comprising at least two common focal points, the common focal points in each channel control group being located along a periphery of a respective circular cross-section of the acoustic channel, wherein phases of the at least two common focal points in each channel control group is equally distributed between 0° and 360° around the periphery of the respective circular cross-section, and the phase of each common focal point in a channel control group corresponds within a preset tolerance to a phase of a closest common focal point in a neighboring channel control group or groups, thereby creating the defined acoustic channel.

15. The method of claim 14, comprising generating the control signal such that each channel control group comprises at least three common focal points.

16. The method of claim 14, comprising generating the control signal such that each channel control group comprises eight common focal points.

17. The method of claim 14, comprising providing contact-less levitation or manipulation of matter by capturing the matter to be levitated or manipulated within the continuous pressure minimum region.

18. The method of claim 14, wherein generating the control signal, by the controller, comprises:
receiving, from an input device communicatively connected to the controller, an input signal indicative of at least one channel parameter, and
generating the control signal also based on the received input signal.

19. The method of claim 14, comprising re-defining the acoustic channel, by the controller, by varying at least one channel parameter, the channel parameters comprising a selection of:
a start position for the path;
an end position for the path;
a direction or route for the path;
a radius of one or more of the respective circular cross-section of the acoustic channel;
a value for N; or
a number of common focal points to be included in each channel control group.

20. The method of claim 19, wherein re-defining the acoustic channel, by the controller, comprises:
receiving, from the input device communicatively connected to the controller, the input signal indicative of at least one channel parameter, and
re-defining the acoustic channel based on the received input signal.

21. A computer program product comprising computer program code stored on a non-transitory computer-readable medium, said computer program code configured for levitating matter, said computer program code comprising computer instructions to cause at least one processor to perform the following operations:
defining an acoustic channel comprising one or more high-pressure region enclosing a continuous pressure minimum region that extends along a defined channel path from a start position to an end position; and
generating, by a controller, a control signal which is configured to cause at least one acoustic transducer array to emit acoustic energy of periodically varying intensity, each of the at least one acoustic transducer array comprising a plurality of transducer elements, and the transducer elements being controllable in response to the control signal so as to emit the acoustic energy at a wavelength and phase delay determined by the control signal, and the control signal being generated such that the emitted acoustic energy forms an acoustic-potential field of acoustic waves being constructively combined at a plurality of common focal points, the plurality of common focal points being divided into N channel control groups, each channel control group comprising at least two common focal points, the common focal points in each channel control group being located along a periphery of a respective circular cross-section of the acoustic channel, wherein phases of the at least two common focal points in each channel control group is equally distributed between 0° and 360° around the periphery of the respective circular cross-section, and the phase of each common focal point in a channel control group corresponds within a preset tolerance to a phase of a closest common focal point in a neighboring channel control group or groups, thereby creating the defined acoustic channel.

22. The acoustic levitation system of claim 1, wherein N is equal to or greater than 2.

23. The method of claim 14, wherein N is equal to or greater than 2.

24. The computer program product of claim 21, wherein N is equal to or greater than 2.

* * * * *